UNITED STATES PATENT OFFICE.

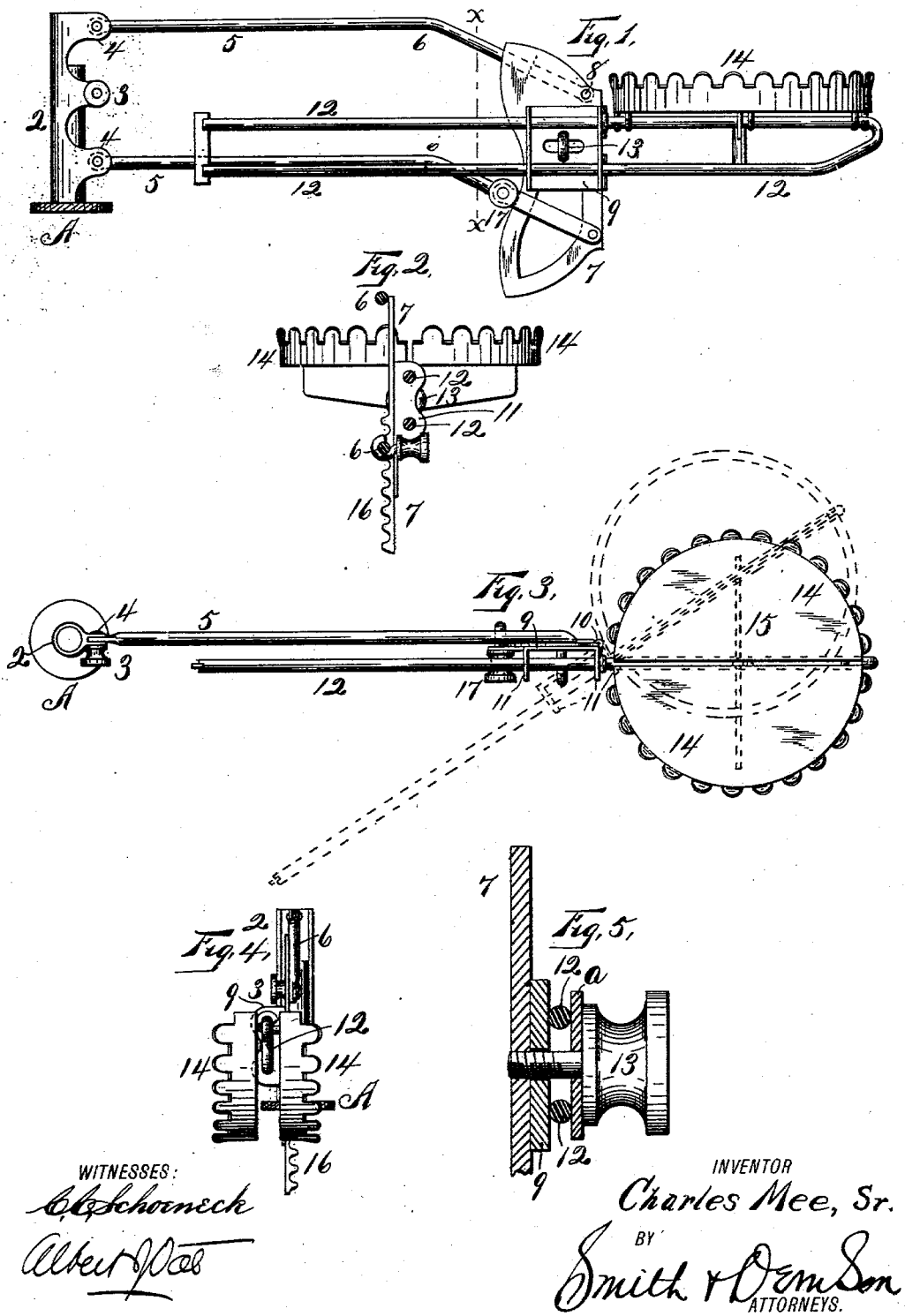

CHARLES MEE, SR., OF CORTLAND, NEW YORK.

LAMP-SHELF BRACKET.

SPECIFICATION forming part of Letters Patent No. 633,874, dated September 26, 1899.

Application filed July 20, 1898. Serial No. 686,471. (No model.)

*To all whom it may concern:*

Be it known that I, CHARLES MEE, Sr., of Cortland, in the county of Cortland, in the State of New York, have invented new and useful Improvements in Lamp-Shelf Brackets, of which the following, taken in connection with the accompanying drawings, is a full, clear, and exact description.

My invention relates to lamp-holding brackets.

My object is to provide an improved bracket comprising a suitable support, a sleeve adjustable thereon, arms hinged to said sleeve angular for a portion of their length and having their outer ends pivoted upon a body, a plate hinged to said body, parallel bars mounted in said plate and adjustable lengthwise therein, leaves hinged upon one of said bars, a button to hold them open or to permit them to drop down or fold, and means to lock said arms in whatever position they may assume with reference to the support, whereby the elevation of the lamp-holding leaves is determined.

My invention consists in mounting the supporting-arms upon a pivotal sleeve, bending them angularly to carry the body in a vertical plane, whereby the lamp-holding leaves are maintained in a horizontal plane, in locking said arms in any vertical position assumed, and in hinging the lamp-holding bars upon said body, whereby the lamp-shelf can be swung at an angle to said body and arms when desired.

It is constructed as follows, reference being had to the accompanying drawings, in which—

Figure 1 is a side elevation. Fig. 2 is a vertical section on line $x\,x$ in Fig. 1. Fig. 3 is a top plan. Fig. 4 is a front elevation showing the leaves folded down. Fig. 5 is a sectional detail of a set-screw-clamping device to lock the supporting-arms, body, guide-plate, and parallel bars together.

A is a suitable support the precise form of which is not essential so long as it is provided with a suitable base to permit it to be secured upon a table or wall and a suitable arm upon which a sleeve 2 can be mounted and clamped by a set-screw 3 to lock it in any position to which it is swung. Said sleeve has suitable ears 4, to which arms 5 are suitably pivoted, said arms being parallel and bent angularly, as at 6, and suitably pivoted to or upon a body 7, as at 8. Upon this body a guide-plate 9 is suitably hinged, as at 10, having parallel vertical flanges 11, in which the parallel bars 12 are mounted to be reciprocated, and normally held in alinement with said arms by means of a set-screw 13, which also holds said plate against said body. This set-screw can be used with a washer $a$ large enough to overlap the bars 12 and clamp them when it is screwed up to hold them in place, or said washer may be integral with said screw. Upon the upper bar leaves 14 are suitably hinged, and 15 is a button suitably mounted to support them to create a lamp-holding shelf. Said button is also so arranged that when it is turned around beside said bars said leaves or shelf-sections will fall or fold down when desired. The body 7 is also provided with a rack 16, and 17 is a thumb-screw engaging with one of the said arms to lock it in one of the rack-tooth spaces, whereby said arms are secured in any position to which they are swung vertically. The angularity of these arms serves to always maintain the lamp-shelf in a horizontal position. It will be seen that it can be swung upon the support, adjusted as to length, the lamp-shelf set at an angle and adjusted as to elevation, so that, for illustration of one of its many uses, the support can be erected upon the table of a sewing-machine and the lamp-shelf swung around into different positions, even being swung through under the arm of the machine, in order to vary the presentation of the light to the work. When it is desired to swing the lamp-shelf at an angle, the set-screw 13 is removed or the bars otherwise released, and the loosening of this screw releases them for longitudinal movement to vary the distance of the lamp-shelf from the support.

Having described my invention, what I claim, and desire to secure by Letters Patent, is—

1. The combination with a support and a clamping-sleeve thereon, of angular and parallel arms pivoted upon said sleeve, a body pivotally mounted upon their free ends, a flanged guide-plate hinged upon and normally folding against said body, parallel bars inserted through said guide-plate and longitudinally adjustable thereon to vary their outward projection beyond it, a lamp-shelf mounted upon the outer ends of said bars, and means to lock said arms, plate and bars together.

2. A lamp-shelf bracket comprising the combination with a support, a sleeve clamped thereon, angular arms hinged to said sleeve, a body hinged upon said arms, and a guide-plate hinged upon said body, of bars mounted and longitudinally adjustable in said plate, a sectional folding lamp-shelf upon said bars, and means to secure said arms, body, and plate together.

In witness whereof I have hereunto set my hand this 22d day of June, 1898.

CHAS. MEE, Sr.

In presence of—
J. W. SMITH,
HOWARD P. DENISON.